United States Patent [19]

Allen

[11] Patent Number: 4,620,925

[45] Date of Patent: Nov. 4, 1986

[54] AEROBIC SEWAGE SYSTEM AND AERATING UNIT THEREFORE

[76] Inventor: Douglas M. Allen, 2761 Pleasant St., Ashland, Ky. 41101

[21] Appl. No.: 763,154

[22] Filed: Aug. 7, 1985

[51] Int. Cl.⁴ ............................ C02F 3/12; C10J 1/18
[52] U.S. Cl. .................................. 210/219; 210/220; 261/93
[58] Field of Search ....................... 210/208, 219, 220; 261/93, 121 R, DIG. 70

[56] References Cited

U.S. PATENT DOCUMENTS

| | | | |
|---|---|---|---|
| 3,053,390 | 9/1962 | Wood | 210/208 X |
| 3,367,071 | 2/1968 | MacLaren | 210/219 X |
| 3,497,185 | 2/1970 | Dively | 210/219 X |
| 3,521,864 | 7/1970 | Welles | 261/93 X |
| 3,865,909 | 2/1975 | Cramer, Jr. | 210/219 X |
| 4,133,850 | 1/1979 | Hauser | 210/219 X |
| 4,140,737 | 2/1979 | Hauser | 210/219 X |
| 4,263,143 | 4/1981 | Ebner et al. | 210/219 X |

Primary Examiner—Tom Wyse
Attorney, Agent, or Firm—Biebel, French & Nauman

[57] ABSTRACT

An aerobic sewage digestion system has a tank including a treatment chamber 16 with a floor, sides, and a top, a sewage inlet into the treatment chamber and an access port means 19 at the top of the treatment chamber located centrally thereof. An agitating and aerating unit, suspended from the access port, includes an elongated generally cylindrical housing 22 having open ends and means 47 for supporting the housing from the access port in a vertical orientation within a pool of sewage contained in the treatment chamber, the housing being in predetermined spaced relation to the floor of the treatment chamber. An electric drive motor 25 having a closed casing is mounted within the housing with its rotatable output shaft 28 extending upwardly through the casing, and a motor mounting plate 26 fastened between the housing and the motor casing. A propeller 38 having a hub fixed to the shaft above the plate and within the housing, is operable when rotated to move sewage upward through the housing from the floor of the treatment chamber, and a deflector 40 supported adjacent the uppermost end of the housing directs flow from the propeller outward into the treatment chamber. An air induction tube 57 has an open end 58 located in close proximity to the hub and extends through the access port to the exterior of the chamber whereby rotation of the propeller produces cavitation adjacent the hub at the location of the open end of the air induction tube, drawing air into the recirculating flow of sewage within the chamber.

4 Claims, 4 Drawing Figures

AEROBIC SEWAGE SYSTEM AND AERATING UNIT THEREFORE

BACKGROUND OF THE INVENTION

This invention relates to an aerobic sewage treatment system, primarily intended for smaller capacity use, in which the outlet sewage line empties into a tank, and the sewage collected therein is treated and decomposed by the aerobic process. The process itself is well known, and systems of this type presently exist for handling large volumes of sewage, for example municipal or factory sewage treatment systems, and to a lesser degree aerobic systems are utilized for residences, where the sewage for one or a small number of residences is so treated.

Typical of the larger municipal or commercial type systems are those shown in U.S. Pat. Nos. 3,827,679, 3,865,721, and 2,082,759 wherein a large motor driven pump or impeller is mounted to circulate the sewage deposited within a tank. The impeller may be supported on a shaft within a venturi or the like, and an air injection line is directed into or near the throat of the venturi, where a lower pressure exists as the result of the induced flow there through, causing the air or oxygen to be drawn into and mixed with the flow as it passes through the venturi.

Smaller aerobic systems, intended primarily for residential use, are typified by the arrangments shown in U.S. Pat. Nos. 2,987,186, and 3,149,071, where a motor is mounted in a housing near the top of the tank and drives an air injecting impeller device through a long shaft. Usually this shaft is hollow and air is drawn into the top of the shaft and passes through a plurality of outlets from the impeller which is positioned within the pool of sewage in the tank. Rotation of the impeller, which may be no more than radially extending tubes, causing a turbulent mixing action of the sewage and also inducing a flow of air through the hollow shaft and the outlets into the disturbed pool of sewage surrounding the impeller device.

SUMMARY OF THE INVENTION

The present invention differs from the prior art in two important respects. First of all, it utilizes a fractional horsepower motor which is submerged in the sewage, thereby obtaining sufficient cooling of the motor as to insure a long duration of operation and simple maintenance. Secondly, the motor drives a standard small propeller through a short rigid shaft extending from the upper end of the motor, and the motor/propeller assembly is supported within a flow directing cylindrical housing which surrounds the unit, directing a flow of sewage from the pool upward around the motor, by the action of the propeller, and past the propeller toward a diverter member which directs the flow radially outward from the tube, thereby setting up, when the motor is operated, a recirculating flow path within the tank.

A propeller of this type inherently produces a small region of cavitation, and propeller design dictates that this region be minimized to the greatest extent possible, since it is well known that erosion due to cavitation will have a detrimental effect upon the edges of the propeller blades. Thus, good propeller design calls for minimization of cavitation, but nevertheless some small amount will ordinarily exist.

The present invention utilizes this small region of cavitation as an air injection location, and since the region of cavitation is inherently at a pressure below ambient, it is possible to draw or induct air into the flow passing by the motor/propeller unit merely by precisely mounting a small tube having an open end which terminates in the cavitation region, within a fraction of an inch of the rotating propeller, and extending to a region outside the tank above the pool level.

In operation, the fractional horsepower motor will rotate at a speed in the order of 3200 r.p.m., and will drive a propeller having a tip-to-tip length of approximately four inches, mounted on a shaft extending from the motor, with the shaft appropriately sealed where it exits the motor housing. The remainder of the motor casing is enclosed, this being the nature of such a motor intended for submerged use.

The support for the motor is provided by a plate member which is secured to the interior of the housing which surrounds the motor/propeller unit, this plate having the motor suspended from it and with the projecting shaft extending through a suitable aperature in the plate and the propeller being mounted directly above the plate on the shaft. The plate is provided with relatively large openings upward of the outer diameter of the motor, to allow the recirculating flow of the sewage pool upward between the housing and the motor, to and past the propeller, and upward to a deflector which may take the form of an inverted generally conical member supported within the tube inward of large laterally directed exit or discharge openings in the tube through which the aerated flow of sewage exits into the tank.

Preferably the housing is constructed of suitable non-corrosive or corrosive resistent materials, a suitable synthetic plastic material, and it is supported at the proper level within the tank by an upper extension, which may be either an integral part of the housing, or one or more rods or straps from which the housing is suspended from the top of the tank. This rod or rods also provides a suitable conduit for the insulated electrical power supply to the motor, and a rigid support for that section of the air inlet tubing extending to the exterior of the tank. The tubing in a typical installation can be either plastic or corrosion resistant metal, and at its lower end it terminates in a generally U-shaped piece, the open upper end of which is securely fastened to locate the open end precisely in the small cavitation region of the propeller.

Thus, the primary object of the invention is to provide such an aerating unit wherein, as the propeller moves a portion of the pool of sewage in the tank in a generally torroidal path which enters the lower open end of the cylindrical housing below the motor/propeller unit, and proceeds upward around the motor, through the openings in the plate and past the propeller, air is drawn into the flow by reason of the below ambient pressure in the cavitation region; wherein this air is immediately mixed with the sewage flow by reason of the rapidly rotating propeller, and the aerated flow then proceeds upward against the diverter and outward into the tank; and wherein the entire unit is of a size that can readily be inserted into the tank and suspended at the proper elevation above the tank bottom and within the normal pool of sewage therein, can be readily removed for maintenance or replacement, and is of such simple and straightforward construction that it will provide years of reliable service under normal operating conditions.

Other objects and advantages of the invention will be apparent from the following description, the accompanying drawings and the appended claims.

DESCRIPTION OF THE PREFERRED EMBODIMENT

Figure 1:
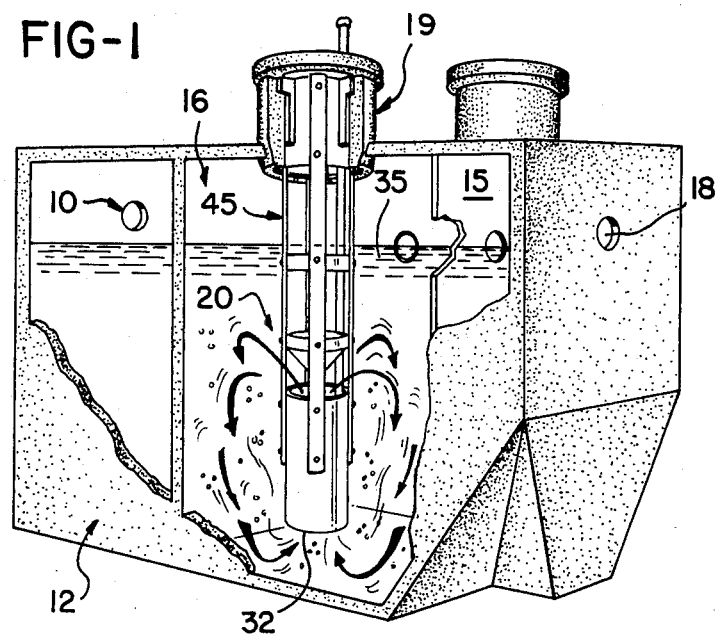
FIG. 1 is a perspective view, with part of the tank wall broken away, showing the over-all arrangement of the invention.
Figure 2:
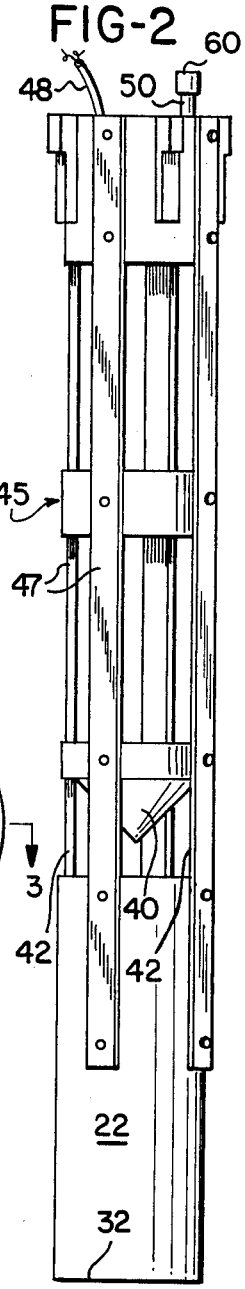
FIG. 2 is a side view of the aerating unit which is provided by the invention.
Figure 3:
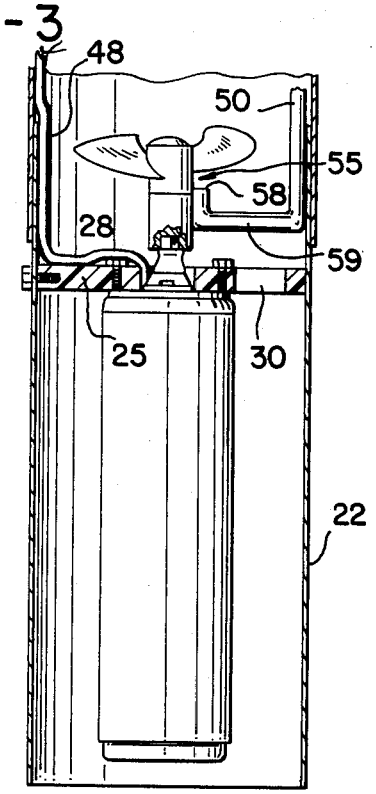
FIG. 3 is an enlarged view showing the motor and propeller in elevation and the surrounding flow directing tubular housing and motor support ring in cross-section.
Figure 4:
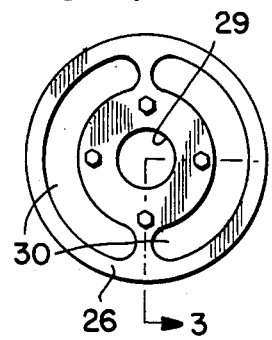
FIG. 4 is a top view of the motor support ring.

Referring to FIG. 1, the present invention is directed primarily to relatively small residential (or small commercial) aerobic sewage treatment systems in which the building sewage system discharges through an outlet line 10 into a below ground tank 12. The tank is divided by a baffle 15 into an aerobic treatment chamber 16 and a settling chamber 17 from which effluent flows into a discharge pipe 18. The tank is provided with a covered access 19, from which an aerating/recirculating unit 20 is suspended.

The unit 20 includes a cylindrical flow directing housing 22 which surrounds and supports an enclosed fractional horsepower motor 25, by a plate 26 bolted to the housing and having the motor suspended from it with the projecting motor shaft 28 extending through an aperture 29 in the plate. The plate is provided with large openings 30 to allow the mixed liquor 35 to flow upward through the open bottom 32 between the aerator housing and the motor, in response to rotation of the propeller 38 which is fixed to the shaft 28. The flow proceeds upward to a deflector 40, which is in the form of an inverted come, supported within the tube, then through discharge openings 42 into the aerator chamber 16.

The housing is constructed of suitable noncorrosive materials, such as a suitable synthetic plastic material, and it is supported at the proper level within the tank by brackets 44 on any upper extension 45 which may be either an integral part of the housing 22, or one or more rods or straps 47 from which the housing is suspended from the normally closed access 19 in the top of the tank. This rod or rods also provides a suitable conduit for the insulated electrical power supply line 48 to the motor, and a rigid support for that section of an air inlet tubing 50 extending to the exterior of the tank.

The motor is submerged in the sewage, thereby obtaining sufficient cooling to insure a long reliable operation. The motor drives a standard small propeller through a short rigid shaft extending from the upper end of the motor, and the motor/propeller assembly is supported within the flow directing housing thereby setting up, when the motor is operated, a recirculating flow path within the tank as shown by arrows in FIG. 1.

A propeller of this type inherently produces a small region of cavitation, and good propeller design dictates that this region be minimized to the greatest extend possible, since it is well known that erosion due to cavitation will have a detrimental effect upon the edges of the propeller blades. Thus, good propeller design calls for minimization of cavitation, but nevertheless some small amount will ordinarily exist.

The present invention utilizes this small region of cavitation as an air induction location 55, and since the region of cavitation is inherently at a pressure below ambient, it is possible to draw air into the mixed liquor flow passing by the motor/propeller unit merely by precisely mounting a small tube 50 having an open end 58 which terminates in the cavitation region, within a fraction of an inch of the rotating propeller, and extending to a region outside the tank above the pool level, such as through the access neck 19. The outer or upper end of tube 50 is closed with a cap 60 which has only a small opening, for example in the order of 1/16 of an inch, to admit air into the tube from the surrounding atmosphere. It has been found that this arrangement muffles any sound from the air intake to the tube, and still provides optimum air input to the aerating system.

Normally such aerobic digesting units utilize a timer controller (not shown) in the power supply circuit to the fractional horsepower motor, in order to provide an on/off cycle of operations, since effective aerobic decomposition, even in a small residence capacity tank, usually does not require continuous operation. Typically, a timer/controller will cycle the unit on for a period of about twenty minutes per hour; the length of this period can be varied in accordance with the needs of a particular system. In operation, the fractional horsepower motor will rotate at a speed in the order of 3200 r.p.m., and will drive a propeller having a tip-to-tip length of approximately four inches.

The tube 50 in a typical installation will be plastic or corrosion resistant material, with its lower end terminating in a generally U-shaped piece 59, the open upper end 58 of which is securely fastened to locate it precisely in the small cavitation region of the propeller. This has been determined to be within one inch or less of the propeller hub, in a lateral direction, and about 19/64 of an inch below the blades of the propeller. Thus, in operation the propeller moves a portion of the pool of sewage in a generally torroidal path which enters the lower open end of the housing 22 below the motor unit, proceeds between the tubular housing and the motor, through the openings 30 in plate 26 and past the propeller 38 where an appropriate amount of air is drawn into the flow by reason of the below ambient pressure in the cavitation region. This air is immediately mixed with the sewage flow by reason of the rapidly rotating propeller, and the aerated flow then proceeds upward against the diverter and outward into the tank. The nature of the recirculating flow, and the location of the open bottom end 32 of housing 22 above the floor of chamber 16 is such that the entire pool is agitated and stirred.

The entire unit is of a size that can readily be inserted into the tank and suspended at the proper elevation above the tank bottom and within the normal pool of sewage therein, as can readily be seen from FIG. 1. The unit can be readily removed for maintenance or replacement, and is of such simple and straightforward construction that it will provide years of reliable service under normal operating conditions.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An agitating and aerating motor-pump assembly for an aerobic sewage digestion system, comprising
   an elongated generally cylindrical housing having an open end and means for supporting said housing in a vertical orientation within a pool of sewage contained in a chamber,
   an electric drive motor having a closed casing mounted within said housing in spaced relation thereto and having a rotatable output shaft extending upwardly through said casing,
   a propeller having a hub fixed to said shaft and operable when rotated to move liquid upward through said open end of said housing and around said motor,
   a power supply line extending to said motor from outside the chamber, and
   an air induction tube having an open end located in close proximity to said propeller hub and extending to a location exterior of the chamber
   whereby rotation of said propeller produces cavitation adjacent said hub at the location of said open end of said air induction tube thereby drawing air into the liquid flow induced by said propeller and said propeller mixes such air into the liquid moved through said housing.

2. A device as defined in claim 1, wherein said means for supporting said housing includes straps extending upward therefrom for attachment to a top part of the chamber, said strap means also providing support for said air induction tube and said power supply line.

3. An aerobic sewage digestion system, comprising
   a tank including a treatment chamber and a settling chamber, said treatment chamber having a floor, sides, and a top,
   means providing a sewage inlet into said treatment chamber and an outlet from said settling chamber,
   access port means at said top of said treatment chamber located centrally thereof,
   an elongated generally cylindrical housing having open ends and means for supporting said housing from said access port means in a vertical orientation within a pool of sewage contained in said treatment chamber and in predetermined spaced relation to said floor of said treatment chamber,
   an electric drive motor having a closed casing mounted within said housing in spaced relation thereto defining a passage therebetween, said motor having a rotatable output shaft extending upwardly through said casing,
   a motor mounting plate fastened to said housing and fastened to said motor casing adjacent said shaft, said plate having openings for flow of liquid therethrough,
   a propeller having a hub fixed to said shaft above said plate within said housing and operable when rotated to move sewage liquor upward through said housing from said floor of said treatment chamber and resulting in an area of cavitation adjacent said hub,
   deflector means supported adjacent the uppermost end of said housing and arranged to direct flow from said propeller outward into said treament chamber,
   a power supply line extending to said motor from outside the chamber, and
   an air induction tube having an open end located in close proximity to said hub at the area of cavitation and extending through said access port to the exterior of the chamber
   whereby rotation of said propeller causes flow of liquid upwardly through said housing and around said motor toward said deflector means and produces cavitation adjacent said hub at the location of said open end of said air induction tube thereby drawing and mixing air into the recirculating flow of sewage liquor within said treatment chamber induced by said propeller.

4. An agitating and aerating motor-pump assembly for an aerobic sewage digestion system, comprising
   an elongated generally cylindrical housing having open ends and means for supporting said housing from said access port means in a vertical orientation submerged within a pool of sewage,
   an electric drive motor having a closed tubular casing of lesser diameter than the internal diameter of said housing and mounted within said housing in spaced relation thereto defining a passage therebetween, said motor having a rotatable output shaft extending upwardly through said casing,
   a motor mounting means fastened between said housing and said motor casing and allowing for flow of liquid throught the passage,
   a propeller within said housing having a hub fixed to said shaft and operable when rotated to move sewage liquor upward through said housing and resulting in an area of cavitation adjacent said hub,
   deflector means supported adjacent the uppermost end of said housing and arranged to direct flow from said propeller outward into an area surrounding said housing,
   a power supply line extending to said motor, and
   an air induction tube having an open end located in close proximity to said hub at the area of cavitation and extending to a region of ambient air away from the pool of sewage
   whereby rotation of said propeller causes flow of liquid upwardly through said housing and around said motor toward said deflector means and produces cavitation adjacent said hub at the location of said open end of said air induction tube thereby drawing and mixing air into the flow of sewage liquor induced by said propeller.

* * * * *